(12) United States Patent
Gottin et al.

(10) Patent No.: US 11,379,375 B1
(45) Date of Patent: Jul. 5, 2022

(54) SYSTEM AND METHOD FOR CACHE MANAGEMENT

(71) Applicant: EMC IP Holding Company LLC, Hopkinton, MA (US)

(72) Inventors: Vinicius Michel Gottin, Rio de Janeiro (BR); Hugo de Oliveira Barbalho, Rio de Janeiro (BR); Rômulo Teixeira de Abreu Pinho, Niterói (BR); Roberto Nery Stelling Neto, Rio de Janeiro (BR); Alex Laier Bordignon, Itaperuna (BR); Daniel Sadoc Menasché, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/235,253

(22) Filed: Apr. 20, 2021

(51) Int. Cl.
*G06F 12/0871* (2016.01)
*G06F 11/34* (2006.01)
*G06F 12/02* (2006.01)
*G06F 12/0862* (2016.01)

(52) U.S. Cl.
CPC ...... *G06F 12/0871* (2013.01); *G06F 11/3414* (2013.01); *G06F 12/0238* (2013.01); *G06F 12/0862* (2013.01)

(58) Field of Classification Search
CPC .................................................. G06F 12/0871

USPC ......................................................... 711/154
See application file for complete search history.

(56) References Cited

U.S. PATENT DOCUMENTS

| 6,546,466 B1 * | 4/2003 | Elko .................... G06F 12/0866 |
| | | 711/E12.019 |
| 8,667,224 B1 | 3/2014 | Yu et al. |
| 10,871,902 B2 | 12/2020 | Dias et al. |
| 10,977,177 B2 | 4/2021 | Gottin et al. |
| 2006/0095646 A1 * | 5/2006 | Gower ................ G06F 13/1684 |
| | | 711/100 |

\* cited by examiner

*Primary Examiner* — Jae U Yu
(74) *Attorney, Agent, or Firm* — Chamberlain, Hrdlicka, White, Williams & Aughtry

(57) ABSTRACT

An information handling system for managing a storage system includes storage for storing profile-based cache policy performance prediction models. The information handling system also includes a storage manager that obtains an input-output profile for a workload hosted by the information handling system during a first period of time; obtains performance metrics for cache policies for the storage system using: the input-output profile, and the profile-based cache policy performance prediction models; obtains a ranking of the cache policies based on the performance metrics; selects a cache policy of the cache policies based on the rankings; and updates operation of a cache of the storage system based on the selected cache policy for a second period of time.

20 Claims, 8 Drawing Sheets

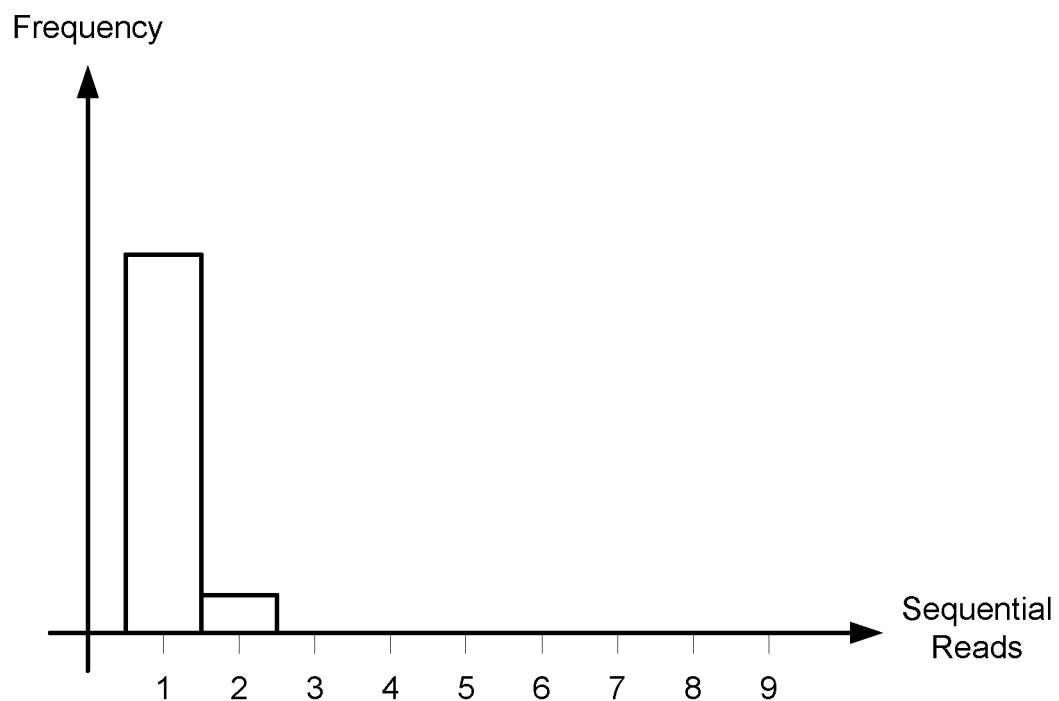
FIG. 3.1
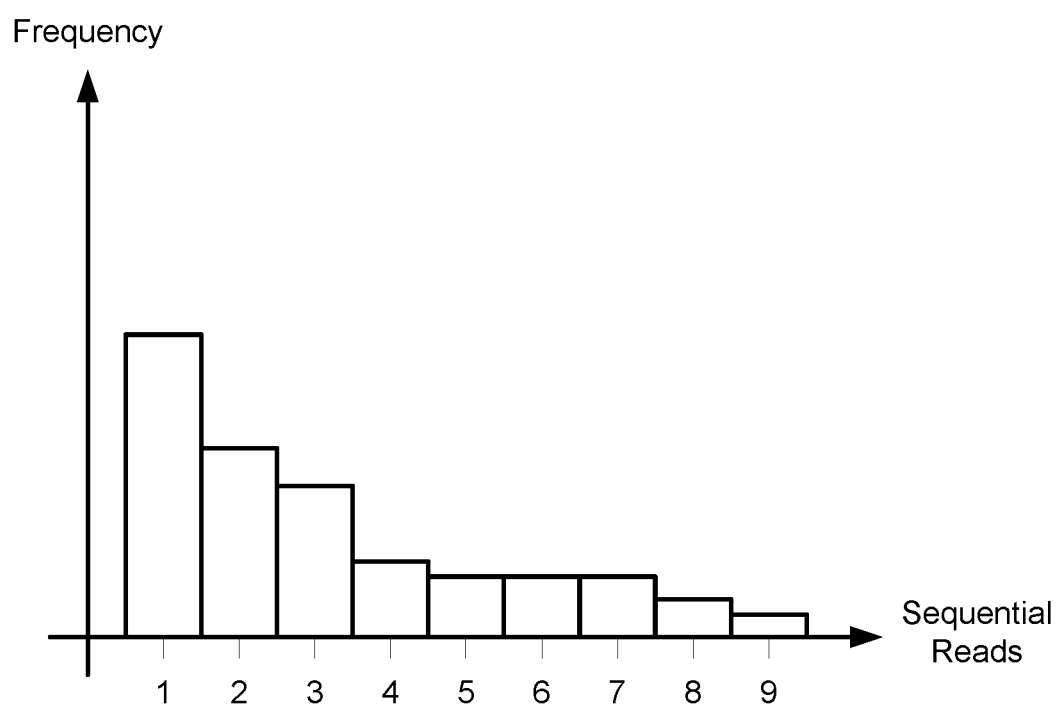
FIG. 3.2

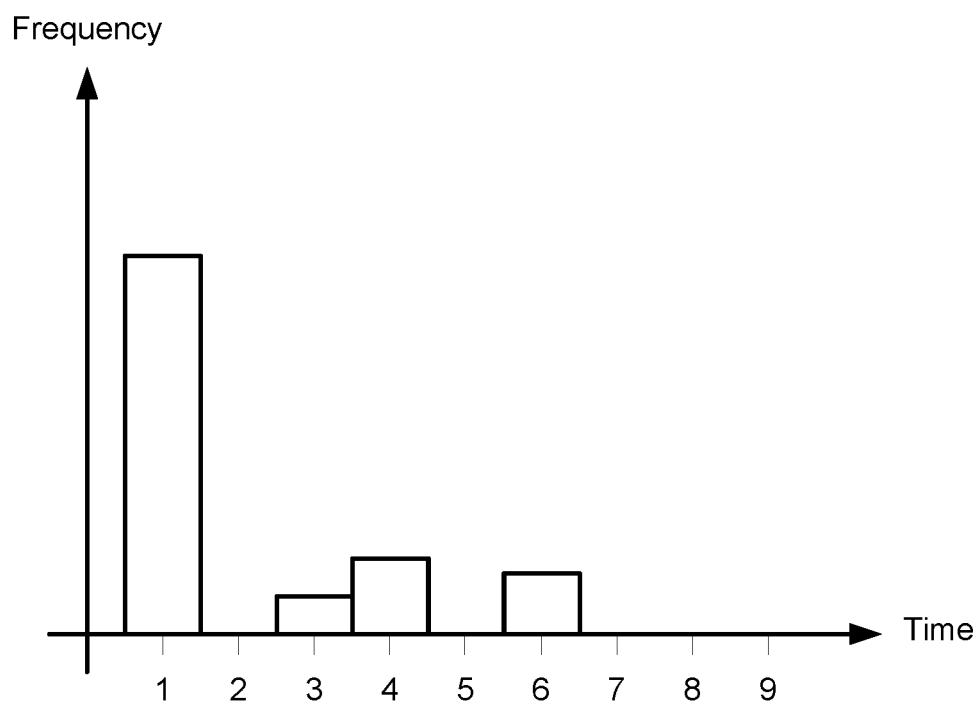
FIG. 6.1
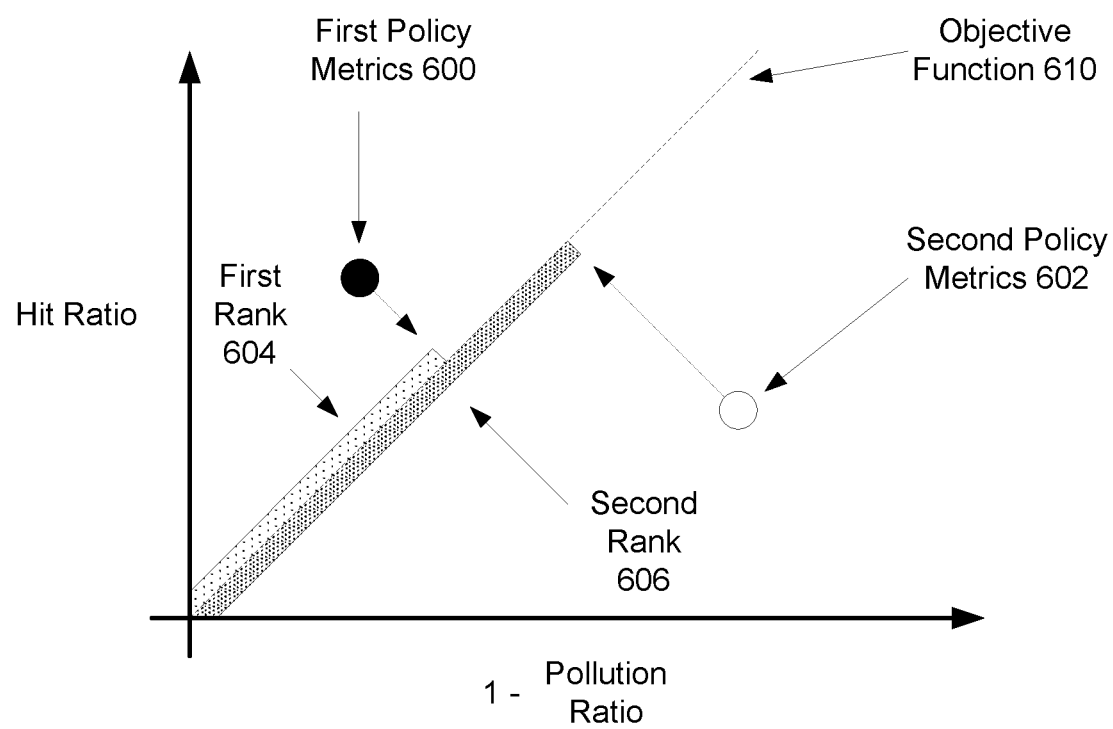
FIG. 6.2

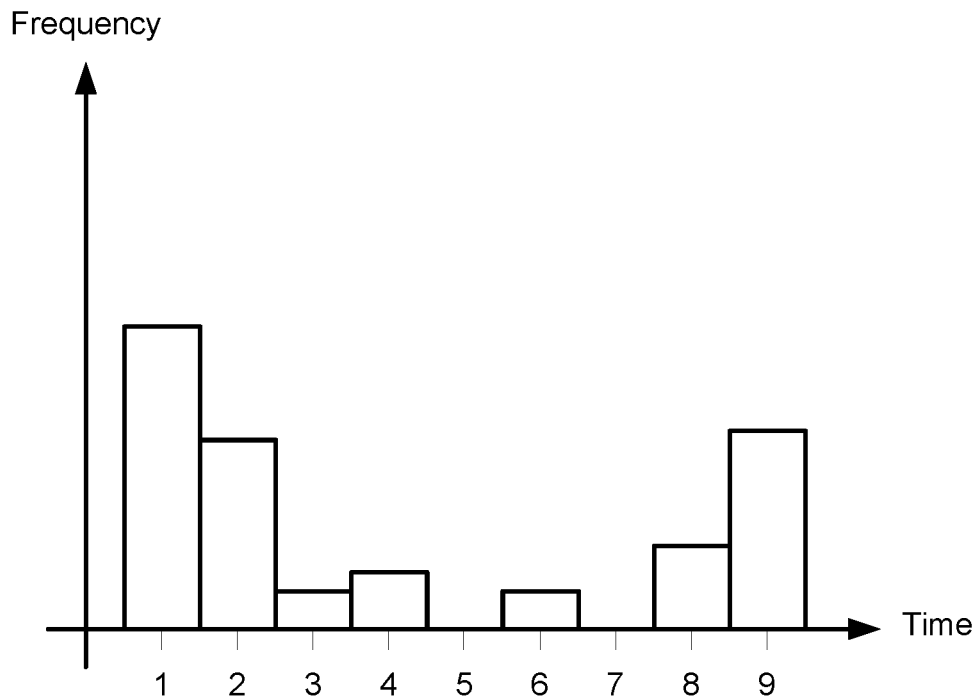
FIG. 6.3
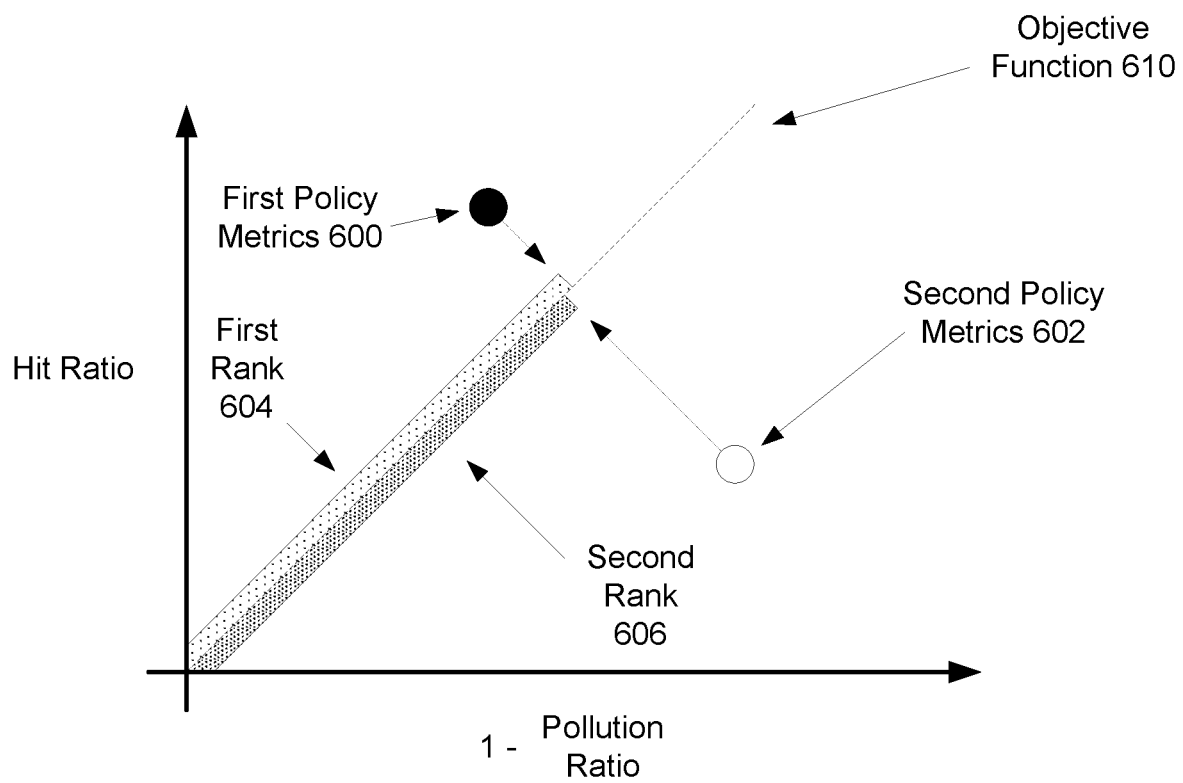
FIG. 6.4

US 11,379,375 B1

SYSTEM AND METHOD FOR CACHE MANAGEMENT

BACKGROUND

Computing devices may provide services. To provide the services, the computing devices may include hardware components and software components. The services provided by the computing devices may be limited by these components.

SUMMARY

In one aspect, an information handling system for managing a storage system in accordance with one or more embodiments of the invention includes storage for storing profile-based cache policy performance prediction models. The information handling system also includes a storage manager that obtains an input-output profile for a workload hosted by the information handling system during a first period of time; obtains performance metrics for cache policies for the storage system using: the input-output profile, and the profile-based cache policy performance prediction models; obtains a ranking of the cache policies based on the performance metrics; selects a cache policy of the cache policies based on the rankings; and updates operation of a cache of the storage system based on the selected cache policy for a second period of time.

In one aspect, a method for managing a storage system in accordance with one or more embodiments of the invention includes obtaining an input-output profile for a workload hosted by an information handling system hosting the storage system during a first period of time; obtaining performance metrics for cache policies for the storage system using: the input-output profile, and profile-based cache policy performance prediction models; obtaining a ranking of the cache policies based on the performance metrics; selecting a cache policy of the cache policies based on the rankings; and updating operation of a cache of the storage system based on the selected cache policy for a second period of time.

In one aspect, a non-transitory computer readable medium in accordance with one or more embodiments of the invention includes computer readable program code, which when executed by a computer processor enables the computer processor to perform a method for managing a storage system. The method includes obtaining an input-output profile for a workload hosted by an information handling system hosting the storage system during a first period of time; obtaining performance metrics for cache policies for the storage system using: the input-output profile, and profile-based cache policy performance prediction models; obtaining a ranking of the cache policies based on the performance metrics; selecting a cache policy of the cache policies based on the rankings; and updating operation of a cache of the storage system based on the selected cache policy for a second period of time.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3.1-3.2 show diagrams of sequentiality profiles in accordance with one or more embodiments of the invention.

FIGS. 6.1-6.4 show diagrams illustrating aspects of the operation of a system similar to that of FIG. 1 over time in accordance with one or more embodiments of the invention.

DETAILED DESCRIPTION

Figure 1:
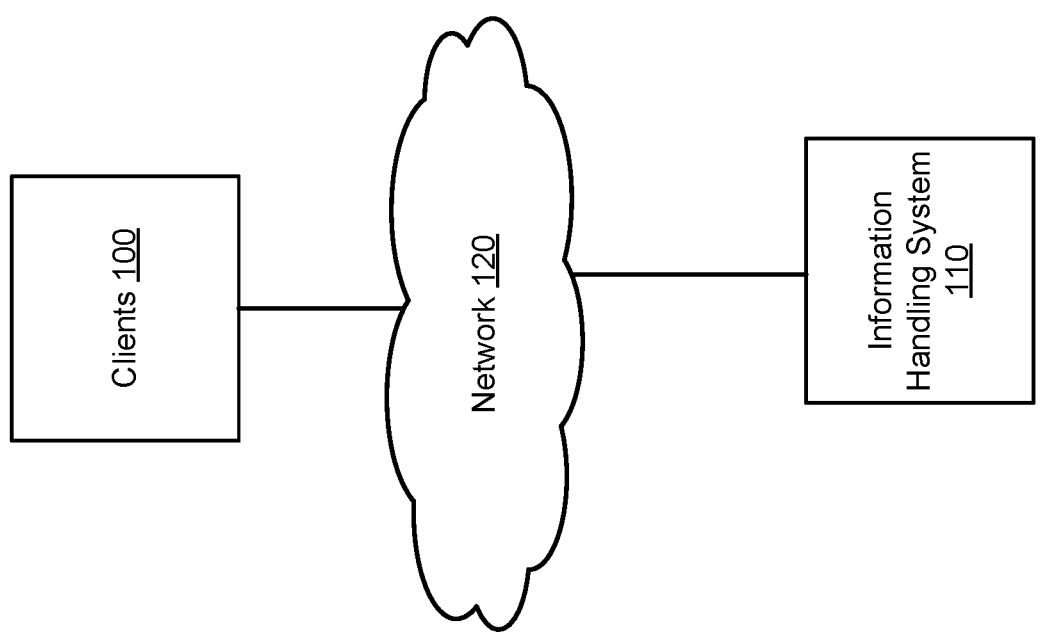
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may be consumed by applications or other entities that provide the computer implemented services. The type and quantity of computer implemented services that may be provided may be limited based on the availability of computing resources. The availability of computing resources may be limited based on the quantity of hardware devices for providing such computing resources and the manner in which the hardware devices are operated.

For example, consider a scenario in which a storage system is being used by an application to store and read data. To improve the rate at which storage resources may be provided by the storage system, the storage system may include a cache. The operation of the cache may impact the quantity and/or quality of storage resources that may be provided by the storage system. If the cache is polluted with data that is unlikely to be read in the future, then the storage system may be forced to utilize slower devices to service read requests. In contrast, if the cache is not polluted and has a high hit rate, then the storage system may be able to utilize the cache to service read requests frequently, thereby allowing the storage system to service read requests at a much faster rate (e.g., providing substantially more storage resources per unit time).

A system in accordance with embodiments of the invention may provide a method of predicting how successful various methods of operating hardware devices may be in the future based on current use of the hardware devices. The predictions may be used to operate the hardware devices during the future periods of time. By doing so, systems in accordance with embodiments of the invention may be able to automatically change their operation in response to changes in use over time.

In the context of a storage system that includes a cache, a system in accordance with embodiments of the invention may periodically evaluate cache policies with respect to current workloads to determine which of the cache policies should be implemented by the storage system. To evaluate the cache policies, the system may predict, based on a sequentiality profile of the current workload, various performance metrics for the cache policies that may be implemented in the future. The performance metrics may be evaluated in a manner that balances the likelihood of cache hits against the pollution level of the cache. The cache policy striking an appropriate balance between these metrics may be selected for implementation. The aforementioned process may be periodically repeated to update the operation of the cache over time.

Turning to FIG. 1, FIG. 1 shows a system in accordance with one or more embodiments of the invention. The system may include any number of clients (100). The clients (100) may provide computer implemented services to users of the clients (100) and/or other devices (e.g., other clients). The clients (100) may provide any number and type of computer implemented services (e.g., data storage services, electronic communication services, etc.).

When providing computer implemented services, the clients (100) may utilize computer implemented services provided by an information handling system (110). The information handling system (110) may provide any number and type of computer implemented services. The computer implemented services may include, for example, database services, instant messaging services, file storage services, etc.

To provide the computer implemented services, the entities hosted by the information handling system (110) (e.g., applications) may utilize hardware devices of the information handling system (110). For example, the information handling system (110) may include processors, memory, storage systems, and/or other types of devices that contribute computing resources (e.g., processing resources, memory resources, storage resources, etc.).

The computer implemented services provided by the entities hosted by the information handling system (110) may be limited based on the quantity of available computing resources. For example, providing computer implemented services may consume computing resources. Consequently, the rate at which computer implemented services may be provided and/or the quality of the provided computer implemented services may depend on the availability of the computing resources.

The availability of computing resources may depend on the quantity and configuration of hardware devices of the information handling system (110). The manner in which a hardware device of the information handling system (110) operates may limit the quantity of computing resources the hardware device is able to contribute to the information handling system (110).

Additionally, the quality of computer implemented services of the entities hosted by the information handling system (110) may depend on the configuration of the hardware devices. Because similar hardware devices may provide computing resources in different manners based on their configurations, the rates at which these computing resources may be consumed to provide different computer implemented services may depend on the type of computer implemented services to be provided.

In general, embodiments of the invention relate to systems, devices, and methods for improving the efficiency of providing computer implemented services using computing resources. Specifically, embodiments of the invention may provide for a method of operating hardware devices in an adaptive manner that allows them to provide better quality and/or quantity of computing resources as workloads that utilize computing resources change over time. By doing so, an information handling system (110) in accordance with embodiments of the invention may be capable of providing larger numbers of computer implemented services having desired qualities even as the workloads imposed on the information handling system (110) change over time.

To do so, the information handling system (110) may modify the manner in which it operates its hardware devices by (i) predicting the manner in which workloads will likely utilize computing resources in the future and (ii) implementing a manner of operating the hardware devices based on the predictions. By doing so, the operation of the hardware devices may be adapted to changing demands of workloads thereby more efficiently utilizing the limited resources available to the hardware devices.

The system of FIG. 1 may include any number of clients (100) and information handling systems (110) that provide computer implemented services to the clients (100). Any of the components of FIG. 1 may be operably connected to any other component and/or other components not illustrated in FIG. 1 via one or more networks (e.g., 120). The networks (e.g., 120) may be implemented using any combination of wired and/or wireless network topologies. The networks may employ any number and type of communication scheme to enable the clients (100) and information handling systems to communicate with each other.

The clients (100) and information handling system (110) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100) and information handling system (110) described in this application and/or all, or a portion, of the methods illustrated in FIGS. 4-5. The clients (100) and information handling system (110) may be implemented using other types of computing devices without departing from the invention. For additional details regarding computing devices, refer to FIG. 7. For additional details regarding the information handling system (110), refer to FIG. 2.

While the system of FIG. 1 has been illustrated and described as including a limited number of specific components, a system in accordance with embodiments of the invention may include additional, fewer, and/or different components without departing from the invention.

Figure 2:
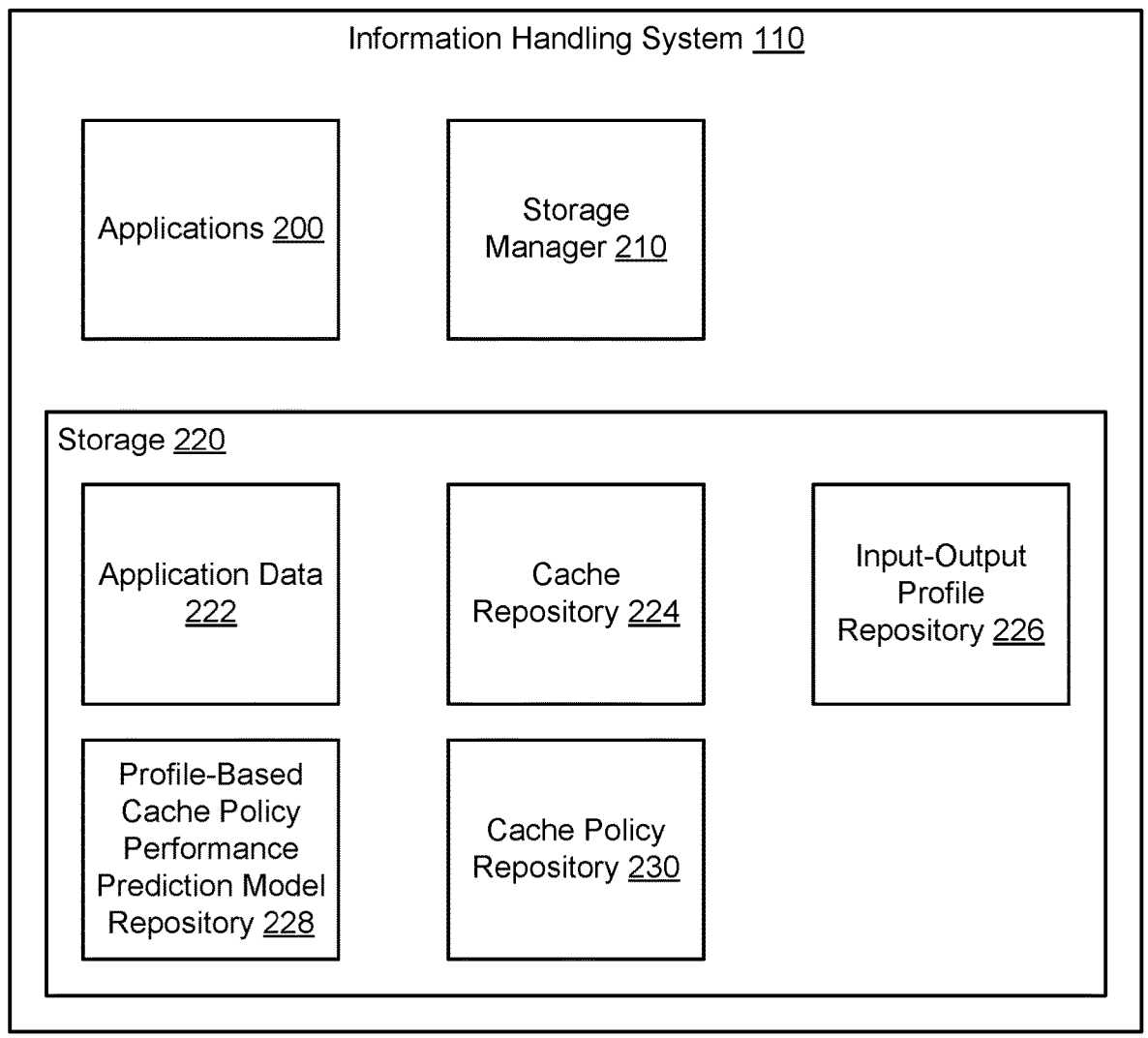
FIG. 2 shows a diagram of an information handling system in accordance with one or more embodiments of the invention.

Turning to FIG. 2, FIG. 2 shows a diagram of an information handling system (110) in accordance with one or more embodiments of the invention. As discussed above, the information handling system (110) may provide any number and type of computer implemented services.

To provide the computer implemented services, the information handling system (110) may include applications (200), a storage manager (210), and storage (220). Each of these components is discussed below.

The applications (200) may provide computer implemented services. The applications (200) may be similar to or different from applications hosted by clients that provide similar or different computer implemented services. As will be discussed in greater detail below, the storage manager (210) may provide resource management services for the applications (200). The storage manager (210) may provide similar resource management services to applications hosted by clients.

When providing their functionality, the applications (200) may store data (e.g., application data (222) in storage (220). To reduce the time required to read data from storage, the information handling system may implement a cache. The cache may store copies of data that may be more frequently and/or likely to be accessed. When a read for such data is received, the copy from the cache may be provided rather than the copy stored in other locations. The cache may be implemented using higher performance storage technology (e.g., high performance memory, solid state storage, etc.) while the originally-stored data may be stored in lower performance storage devices. As will be discussed below, the storage manager (210) may decide which portions of data should be replicated in the cache using one or more cache policies.

The storage manager (210) may provide resource management services to applications and/or other types of entities. The resource management services may (i) predict the likely workloads that will be imposed on the information handling system in the future and (ii) update the operation of the information handling system based on the workload predictions. Specifically, operation of a cache for a storage system (e.g., storage (220)) may be updated based on the workload predictions.

To do so, the storage manager (210) may utilize one or more predictive models (e.g., inference models trained to generate predictions) that predict the performance of various methods of operating the cache in the future based on a current sequentiality profile of storage workloads imposed on a storage system. The predictive models may be implemented using, for example, machine learning, neural networks, and/or other frameworks for generating predictions.

For example, with respect to machine learning, the storage manager (210) may collect training data and use the training data to train a machine learning model (e.g., a data structure usable to generate predictions by performing one or more predetermined actions using the data structure). The output of the machine learning model may be, for example, one or more computed values. The computed values may be predictions regarding how a cache will perform during a future period of time while operated in accordance with a corresponding method of operating the cache. The predictions may specify any quantity of information usable to discriminate the performance of the cache when operated in accordance with different methods in the future.

To collect the training data, the storage manager (210) may (i) monitor the use of a storage system during a first period of time and a second period of time, (ii) calculate a sequentiality profile of the use of the storage system during the first period of time, (iii) calculate performance metrics for any number of methods of operation of a cache during the second time period based on the use of the cache during the second period of time (e.g., to create a relationship between a sequentiality profile during a first period of time and performance metrics during the second period of time), and/or (iv) repeat steps (i)-(iii) to obtain the training data (e.g., a set of sequentiality profile to performance metrics relationships).

Using the training data, the storage manager (210) may adapt the machine learning model using any method (e.g., utilizing an objective function) without departing from the invention to predict the performance of different methods of operating the storage system based on the sequentiality profile of a workload. The trained machine learning model may be stored in a profile-based cache policy performance prediction model repository.

In one or more embodiments of the invention, the storage manager (210) does not generate the predictive models. Rather, the predictive models may be obtained from other devices, may be pre-programmed, etc.

The storage manager (210) may collect uses of the storage system (e.g., records of input-output imposed on the storage system by a workload) during operation of the information handling system and generate input-output profiles for the workloads. Such profiles may be stored in an input-output profile repository (226). An input-output profile may reflect a sequentiality of use of the storage system by the workloads. For additional details regarding sequentiality of use of a storage system and/or input-output profiles, refer to FIGS. 3.1-3.2.

To manage the operation of the storage system, the storage manager (210) may manage the operation of a cache for the storage system using various cache policies. A cache policy may specify the manner in which the cache is to be operated. Specifically, the cache policies may specify different look ahead quantities or other quantities that manage the quantity of data stored in a cache in response to a read of data in storage.

For example, to manage a cache, more data than is read from storage during a cache miss (e.g., when a cache does not include a to-be-read portion of data) may be stored in the cache. The amount of data may be specified by a look ahead quantity. The look ahead quantity may specify, for example, a quantity of additional data to be read sequentially from the storage location of a read piece of data (e.g., if block 210 is read, blocks 211, 212, and 213 may be read if the look ahead value is 3 blocks). By doing so, cache misses may be less likely to occur.

However, using a look ahead quantity for managing operation of a cache may also introduce cache pollution. Cache pollution may refer to data stored in a cache that is never used to satisfy reads. Consequently, its presence in the cache may prevent other data from being stored in the cache, which may avoid cache misses.

The look ahead quantities implemented by a storage system for cache management purposes may directly impact both the cache hit rate and cache pollution (referred to herein as performance metrics of a cache policy). The cache hit rate and cache pollution for a given policy may depend on the cache policy implemented by the storage system. Thus, by selecting and implementing different cache policies over time, an information handling system in accordance with one or more embodiments of the invention may provide an improved cache hit rate and/or reduced cache pollution level by using cache policies tailored to changing workloads over time.

Figure 4:
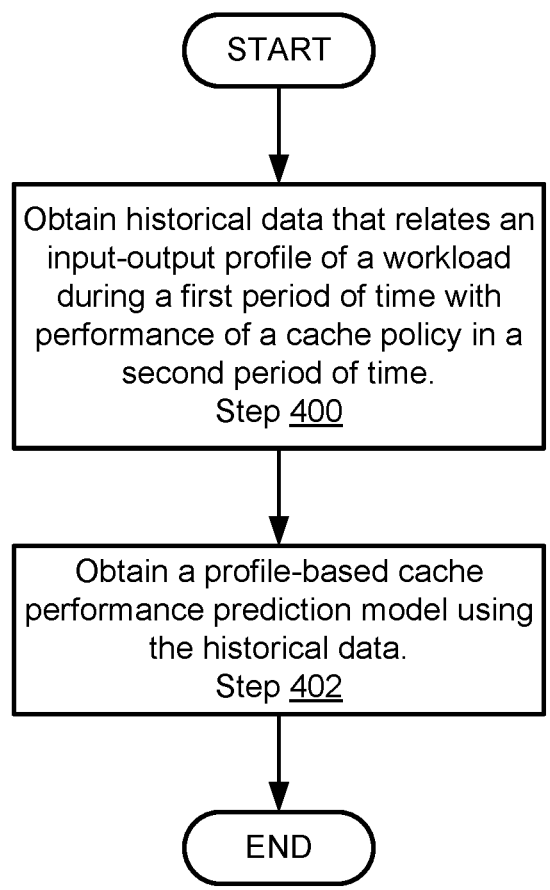
FIG. 4 shows a flowchart of a method of obtaining predictive models in accordance with one or more embodiments of the invention.
Figure 5:
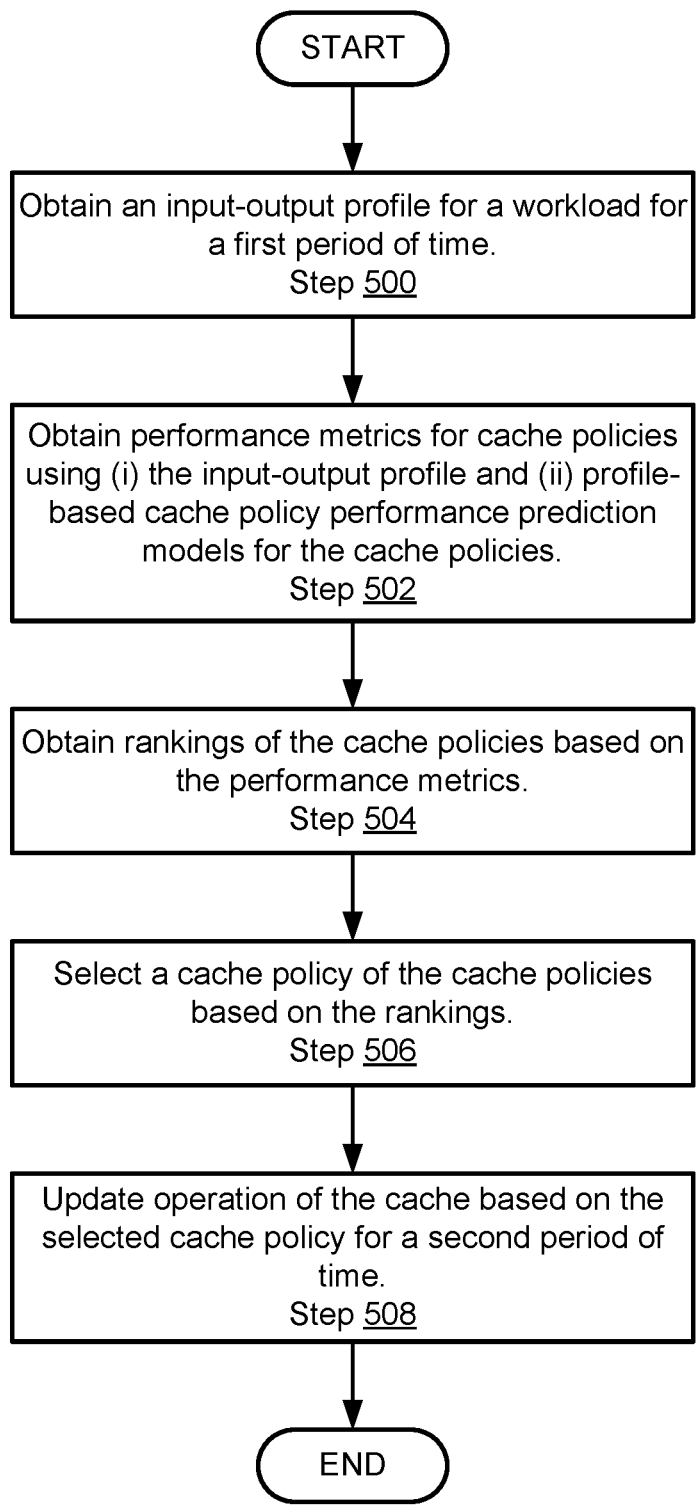
FIG. 5 shows a flowchart of a method of managing the operation of a hardware device using predictive models in accordance with one or more embodiments of the invention.

When providing its functionality, the storage manager (210) may perform all, or a portion, of the methods illustrated in FIGS. 4-5.

In one or more embodiments of the invention, the applications (200) and/or storage manager (210) are implemented using a hardware device including circuitry. The hardware device may be, for example, a digital signal processor, a field programmable gate array, or an application specific integrated circuit. The circuitry may be adapted to cause the hardware device to perform the functionality of the applications (200) and/or storage manager (210). The applications (200) and/or storage manager (210) may be implemented using other types of hardware devices without departing from the invention.

In one or more embodiments of the invention, the applications (200) and/or storage manager (210) are implemented using a processor adapted to execute computing code stored on a persistent storage that when executed by the processor performs the functionality of the applications (200) and/or storage manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data are provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may include different types of devices that provide different classes of data storage services (e.g., different read/write times, different latencies, etc.). In one or more embodiments of the invention, the storage (220) includes a number of lower class devices used for bulk storage of data such as the application data and a number of higher class devices used for implementing a cache for data stored in the lower class devices. For example, the storage (220) may store a cache repository (224) in the higher class devices while application data (222) and/or other types of data are stored in the lower class devices. The storage (220) may include a larger quantity of lower class devices than higher class devices. Consequently, only a subset of the application data (222) may be stored in the cache repository (224).

The storage (220) may store data structures including, for example, application data (222), a cache repository (224), an input-output rate repository (226), a profile-based cache policy performance prediction model repository (228), and a cache policy repository (230). Each of these data structures is discussed below.

The application data (222) may be implemented using one or more data structures that include information utilized by the applications (200). For example, the applications (200) may store any type and quantity of data in the application data (222). Consequently, the applications (200) may perform workloads that result in access patterns for the storage (220) that change over time due to different workloads performed by the applications (200) over time. The application data (222) may be stored in lower class devices (e.g., hard disk drives, tape drives, solid state storage devices).

The application data (222) may be maintained by, for example, the applications (200). For example, the applications (200) may add, remove, and/or modify information included in the application data (222).

The data structures of the application data (222) may be implemented using, for example, lists, tables, unstructured data, databases, etc. While illustrated in FIG. 2 as being stored locally, the application data (222) may be stored remotely and may be distributed across any number of devices without departing from the invention.

The cache repository (224) may be implemented using one or more data structures that include cached data (e.g., portions of the application data (222) and/or other data). The portions of data stored in the cache repository (224) may be specified by cache policies stored in the cache policy repository (230). The cache repository (224) may be stored in high class devices (e.g., memory such as random access memory, high performance solid state storage devices, etc.).

The cache repository (224) may be maintained by, for example, the storage manager (210). For example, the storage manager (210) may add, remove, and/or modify information included in the cache repository (224) based on cache policies that it implements over time.

The data structures of the cache repository (224) may be implemented using, for example, lists, tables, unstructured data, databases, etc. While illustrated in FIG. 2 as being stored locally, the cache repository (224) may be stored remotely and may be distributed across any number of devices without departing from the invention.

The input-output profile repository (226) may be implemented using one or more data structures that include information regarding input-output of the storage (220) over time. Specifically, the input-output may include a list of reads during a predetermined period of time. The input-output may be used to obtain a sequentiality profile for a period of time.

The input-output profile repository (226) may be maintained by, for example, the storage manager (210). For example, the storage manager (210) may add, remove, and/or modify information included in the input-output profile repository (226).

The data structures of the input-output profile repository (226) may be implemented using, for example, lists, tables, unstructured data, databases, etc. While illustrated in FIG. 2 as being stored locally, the input-output profile repository (226) may be stored remotely and may be distributed across any number of devices without departing from the invention.

The profile-based cache policy performance prediction model repository (228) may be implemented using one or more data structures that include cache policy performance prediction models (and/or information regarding such models such as how to use the models). These models may take, as input, a sequentiality profile and provide, as output, a prediction regarding the performance of a cache if operated in accordance with corresponding cache policies during a future period of time (e.g., a period of time following a period of time associated with the sequentiality profile used as input to the models). Any number of such models may be used to determine, for a given sequentiality profile, which cache policy will provide the most desirable operation of the storage (220).

For example, each model may, as output, provide a hit ratio and pollution level for the cache for the storage. The hit ratio may reflect how likely cache hits are to occur during a predetermined period of time and to what degree the cache will likely become polluted with data that is infrequently read. As will be discussed in greater detail below, these metrics may be used to ascertain which of the cache policies to implement during a future period of time.

The profile-based cache policy performance prediction model repository (228) may be maintained by, for example, the storage manager (210). For example, the storage manager (210) may add, remove, and/or modify information included in the profile-based cache policy performance prediction model repository (228).

The data structures of the profile-based cache policy performance prediction model repository (228) may be implemented using, for example, lists, tables, unstructured data, databases, etc. While illustrated in FIG. 2 as being stored locally, the profile-based cache policy performance prediction model repository (228) may be stored remotely and may be distributed across any number of devices without departing from the invention.

The cache policy repository (230) may be implemented using one or more data structures that include cache policies (and/or information regarding the cache policies such as how to implement them). The cache policies may specify which data to include in the cache repository. For example, the cache policies may specify look-ahead values or other information used to identify which data, when read from low performance storage, to store a copy of in the cache.

A look-ahead value may specify a number of blocks, in addition to that read, to store in storage. The larger the look-ahead value, the more data may be added to the cache (when a cache miss occurs) for a same read size. The cache policies may specify which data to add to a cache via other methods without departing from the invention.

Different cache policies may cause, for the same read patterns, different data to be added to the cache. Consequently, caches operated in accordance with different cache policies may be better able to service different types of workloads.

The cache policy repository (230) may be maintained by, for example, the storage manager (210). For example, the storage manager (210) may add, remove, and/or modify information included in the cache policy repository (230).

The data structures of the cache policy repository (230) may be implemented using, for example, lists, tables, unstructured data, databases, etc. While illustrated in FIG. 2 as being stored locally, the cache policy repository (230) may be stored remotely and may be distributed across any number of devices without departing from the invention.

While the storage (220) has been illustrated and described as including a limited number and type of data, a storage in accordance with embodiments of the invention may store additional, less, and/or different data without departing from the invention.

While the information handling system (110) has been illustrated and described as including a limited number of specific components, an information handling system in accordance with embodiments of the invention may include additional, fewer, and/or different components without departing from the invention.

Turning to FIGS. 3.1-3.2, these figures show graphical depictions of sequentiality profiles in accordance with one or more embodiments of the invention.

Turning to FIG. 3.1, FIG. 3.1 shows a plot of a first sequentiality profile in accordance with one or more embodiments of the invention. The plot shows a histogram of the frequency of sequential reads (e.g., the number of sequential blocks read from storage when servicing a read request for data in the storage system) of different lengths (e.g., different numbers of sequentially read blocks) encountered during a predetermined period of time.

As seen in FIG. 3.1, the plot indicates that, during the predetermined period of time, most reads were only 1 block in length (indicated by the large size of the first bar) while a smaller number of reads were 2 blocks in length. This first sequentiality profile indicates that it may be more desirable to manage the cache using a small look-ahead value because few reads will require information from more than one block. Consequently, if a higher look-ahead value is used, the cache will likely become polluted with large amounts of data that will never be read thereby preventing the cache from being populated with data that is likely to be read.

Turning to FIG. 3.2, FIG. 3.2 shows a plot of a second sequentiality profile in accordance with one or more embodiments of the invention. The plot shows a histogram of the frequency of sequential reads of different lengths encountered during a predetermined period of time.

As seen in FIG. 3.2, the plot indicates that, during the predetermined period of time, reads varied in lengths from 1 to 9 blocks. This second sequentiality profile indicates that it may be more desirable to manage the cache using a large look-ahead value because many reads will require information from more than one block. Consequently, if a higher look-ahead value is used, the cache will likely attain a better hit rate.

The sequentiality profiles illustrated in FIGS. 3.1 and 3.2 may be obtained using input-output profiles. As discussed with respect to FIG. 2, an input-output profile may specify the reads that occurred during a period of time. A histogram of the lengths of sequential reads used to service the reads specified by the input-output profile may be constructed to obtain the corresponding sequentiality profiles.

While the histograms are illustrated in FIGS. 3.1 and 3.2 as having specific bin sizes, one of ordinary skill in the art will appreciate that other bin sizes and/or non-uniform bin sizes may be used without departing from the invention.

As discussed above, the system of FIG. 1 may more efficiently utilize hardware devices by adapting the operation of these devices as the workloads performed using the hardware devices change. FIGS. 4-5 illustrate methods that may be performed by components of the system of FIG. 1 when utilizing hardware devices.

FIG. 4 shows a flowchart of a method in accordance with one or more embodiments of the invention. The method depicted in FIG. 4 may be performed to obtain profile-based cache performance prediction models in accordance with one or more embodiments of the invention. The method shown in FIG. 4 may be performed by, for example, an information handling system (e.g., 110, FIG. 1). Other components of the system in FIG. 1 (or other entities) may perform all, or a portion, of the method of FIG. 4 without departing from the invention. For example, a higher level management entity (not shown in FIG. 1) may collect historical data (discussed below), generate the prediction models, and may distribute the prediction models to information handling systems.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, historical data that relates an input-output profile of a workload during a first period of time with performance of a cache policy in a second period of time is obtained.

In one or more embodiments of the invention, the historical data is obtained by recording the input-output of the workload during the first time period and the performance of the cache policy during the second period of time. The second period of time may be after the first period of time. Step 400 may be repeated any number of times to obtain any number of such relationships. The performance of the cache policy may include a hit rate for the cache and a pollution level for the cache.

In one or more embodiments of the invention, the performance of multiple cache policies may be simultaneously evaluated. For example, for a given workload, any number of duplicative caches may be implemented and each may implement respective cache policies. Consequently, different caches may be usable to identify the performance of the respective cache policies during the second period of time.

For example, consider a scenario where historical data is to be obtained for a database workload. In such a scenario, an instance of a database may be instantiated in and executed on a computing device. The computing device may host a storage system similar to that described with respect to FIGS. 1-3.2 but which may implement multiple duplicative caches that each implement different cache policies. To obtain the historic data, the computing device may record the input-output for the database workload for a first time period (e.g., 60 seconds, 10 minutes, etc.) and a second time period (e.g., an additional 60 seconds, 10 minutes, etc.). During (and/or after/at the end of) the second time period, performance of each of the caches may be identified (e.g., calculate hit rate and pollution level). The input-output profile may then be converted into a sequentiality profile as described with respect to FIGS. 3.1-3.2. Relationships between the sequentiality profile and the respective performances of the cache may be established (e.g., a list having a sequentiality profile, identifiers of the various cache policies, and the performance of each of the respective caches implementing the respective cache policies).

The process described above in step 400 may be repeated any number of times and for any number of workloads to obtain relationships between a wide variety of different sequentiality profile-cache performance relationships.

In step 402, a profile-based cache performance prediction model is obtained using the historical data.

In one or more embodiments of the invention, the profile-based cache performance prediction model is implemented using a machine learning model (e.g., artificial neural networks, decision trees, support-vector machines, regression analysis, Bayesian networks, genetic algorithms, etc.). The machine learning model may be trained using the historical data to predict, as a function of sequentiality profile, the performance (e.g., hit rate, pollution level, and/or other relevant metrics for evaluating the hypothetic performance of different cache policies) of the cache policies that may be implemented by a storage system. The profile-based cache performance prediction model may be implemented using other types of predictive algorithms without departing from the invention.

The method may end following step 402.

Using the method illustrated in FIG. 4, any number of profile-based cache performance prediction models may be obtained. These models may be distributed to any number of information handling systems for storage system management purposes (and/or other devices for similar and/or different purposes). As will be discussed in greater detail with respect to FIG. 5, the information handling systems may use these predictive models to decide how to manage the operation of caches of the storage systems.

Turning to FIG. 5, FIG. 5 shows a flowchart of a method in accordance with one or more embodiments of the invention. The method depicted in FIG. 5 may be performed to manage a storage system in accordance with one or more embodiments of the invention. The method shown in FIG. 5 may be performed by, for example, an information handling system (e.g., 110, FIG. 1). Other components of the system in FIG. 1 (or other entities) may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, an input-output profile for a workload for a first period of time is obtained. The first period of time may be for a fixed duration (or variable duration) during which an existing cache policy is being implemented by a storage system of the information handling system.

The input-output profile for the workload may be obtained by recording the reads of data in the storage system during the first period of time. Specifically, the input-output profile may be populated by listing the number of blocks sequentially read for each read. As used herein, a read refers to an elemental operation of the storage system with respect to reading a predetermined number of blocks starting at a predetermined block. In contrast, when a file is read by an operating system or other higher level management entity, any number of storage system reads may be performed to obtain various portions of data stored in sequential and/or non-sequential blocks of the storage system to read the file stored in the storage system.

The first period of time may be for a predetermined amount of time such as, for example, ten minutes (or a fraction thereof), one minute (or a fraction thereof), one second (or a fraction thereof), or other amounts of time. The first period of time may be selected on the basis of, for example, balancing the computational overhead with respect to performing the methods disclosed herein against the computational performance improvement provided by the methods disclosed herein. Other metrics may be used to select the duration of the first period of time without departing from the invention.

In step 502, performance metrics for cache policies are obtained using (i) the input-output profile and (ii) profile-based cache policy performance prediction models for the cache policies.

In one or more embodiments of the invention, the performance metrics are obtained by obtaining a sequentiality profile based on the input-output profile as described with respect to FIGS. 3.1-3.2. The performance metrics may be obtained by using the sequentiality profile as input to the profile-based cache policy performance prediction models. Each prediction model may provide, as output, performance metrics for a cache policy associated with the respective prediction model. The performance metrics may also be associated with a second period of time (e.g., a future period of time) following the first period of time.

In one or more embodiments of the invention, the performance metrics include a hit ratio and a pollution level. The performance metrics may include additional and/or different metrics without departing from the invention.

In step 504, rankings of the cache policies are obtained based on the performance metrics. The rankings may indicate which of the cache policies should be implemented by a storage system to provide a desired quality of storage services. The desired quality may be, for example, the highest hit ratio, the lowest pollution level, and/or a weighted balance of hit ratio and pollution level.

In one or more embodiments of the invention, the cache policies are ranked using an objective function that balances hit ratio against pollution level. The objective function may provide a scalar value for a given hit ratio and pollution level. The scalar value may be equal to a projection of the point having Cartesian coordinates [1-pollution level, hit ratio] onto the line (e.g., a tradeoff line) defined by the coordinates [0,0] and [1,1]. For a graphical illustration of the projection of such points onto the line, refer to FIGS. 6.1-6.4.

However, different definitions for the tradeoff line may be implemented without departing from embodiments of the invention. For example, depending on the goals of the information handling system, it may be more valuable to more heavily weight hit ratio than pollution level, or vice versa. Consequently, the coordinates of the points defining the tradeoff line may vary. For example, the line may be defined by the points [0,0] and [0.5,1] to more heavily weight the hit ratio versus the pollution level.

To rank the cache policies, the scalar values for the performance metrics associated with each of the cache policies may be compared to one another. Higher scalar values may indicate higher ranks.

By utilizing the ranking approach described in step 504, cache policies associated with lower cache hit rates may be ranked higher than cache policies associated with higher cache hit rates due to differences in the associated pollution levels. Similarly, cache policies associated with higher pollution levels may be ranked higher than cache policies associated with lower pollutions levels due to differences in the associated cache hit rates. Thus, the ranking approach discussed above may provide a balanced approach for evaluating both hit ratio and pollution level.

In step 506, a cache policy of the cache policies is selected based on the rankings. The cache policy having the highest ranking may be selected. If the selected cache policy is the same as currently implemented, then the method may end following step 506 (e.g., if no change in cache policy will occur based on the cache policy selection).

In step 508, operation of the cache of a storage system is updated based on the selected cache policy for a second time period. The operation of the cache may be updated by storing data in the cache in accordance with the rules, actions, and/or other information included in the selected cache policy. For example, the cache policy may be implemented by populating the cache with data from additional blocks beyond that implicated by reads being serviced by the storage system in accordance with the selected cache policy. The storage manager (210, FIG. 2) of the information handling system may implement the cache policy directly and/or by programming or otherwise causing other entities (e.g., controllers/other devices of the storage system, hardware management layers of the information handling system, etc.) to implement the selected cache policy.

The second time period may be a future time period. For example, the information handling system of FIG. 1 may periodically reevaluate which cache policy it should implement. For example, it may reevaluate every second. To reevaluate, it may obtain a sequentiality profile for a just completed period, calculate the performance metrics, and select a cache policy to be implemented for the next period based on the metrics.

The method may end following step 508.

Using the method illustrated in FIG. 5, an information handling system may modify the manner in which it caches data based on its current workloads. By doing so, the operation of its storage system may be modified to better meet the demands of its current workloads. Consequently, as the information handling system's workloads change over time, so to may its manner of operating its storage system.

To implement the method of FIG. 5, the method may be periodically performed, performed at predetermined points in time, and/or may be performed in response to the occurrence of predetermined conditions without departing from the invention.

To further clarify embodiments of the invention, a non-limiting example is provided in FIGS. 6.1-6.4. These figures illustrate diagrams of the operation of a system similar to that that illustrated in FIG. 1 over time.

Example

Consider a scenario in which an information handling system is tasked with providing database services to a client.

The client may periodically need access to the data in the database thereby causing the information handling system to read data from the database. To improve the speed at which data may be provided to the client, the information handling system may host a storage system that includes a cache. To decide how to operate the cache, the information handling system monitors the input-output of the storage system for a first period of time. Using the input-output, the information handling system obtains a sequentiality profile for the database workload during the first period of time.

Turning to FIG. 6.1, FIG. 6.1 shows a graphical depiction of the sequentiality profile. As seen in FIG. 6.1, a large portion of the reads do not implicate sequential reads while a minority of the reads implicate sequential reads of 3, 4, and 6 blocks. Using the sequentiality profile, the information handling system predicts the hit ratio and pollution level for two different cache policies.

Turning to FIG. 6.2, FIG. 6.2 shows a graphical depiction of the first policy metrics (600) and the second policy metrics (602) for the first cache policy and second cache policy, respectively. Additionally, the objective function (610) is also plotted.

To rank the first cache policy with respect to the second cache policy, the first policy metric (600) is projected onto the objective function (610). In FIG. 6.2, the projection is illustrated using the box filled with sparse dotting. The first rank (604) for the first cache policy is the value of the projection onto the objective function (610).

The second policy metric (602) is also projected onto the objective function (610). In FIG. 6.2, the projection is illustrated using the box filled with dense dotting. The second rank (606) for the second cache policy is the value of the projection of the second policy metric (602) onto the objective function (610). As seen in FIG. 6.2, the second rank (606) is larger than the first rank (604).

Because the second rank (606) is larger than the first rank (604), the information handling system implements the second cache policy. Specifically, the information handling system programs controllers in its storage system to automatically populate the cache in accordance with rules specified by the second cache policy.

Over time, the use of the database by the client changes resulting in different patterns of input-output. Turning to FIG. 6.3, FIG. 6.3 shows a graphical representation of a second sequentiality profile corresponding to the new input-output patterns. Using the second sequentiality profile, the information handling system predicts the hit ratio and pollution level for the two cache policies.

Turning to FIG. 6.4, FIG. 6.4 shows a graphical depiction of the first policy metrics (600) and the second policy metrics (602) for the first cache policy and second cache policy, respectively.

To rank the first cache policy with respect to the second cache policy, the first policy metric (600) is projected onto the objective function (610). In FIG. 6.2, the projection is illustrated using the box filled with sparse dotting. The first rank (604) for the first cache policy is the value of the projection onto the objective function (610).

The second policy metric (602) is also projected onto the objective function (610). In FIG. 6.4, the projection is illustrated using the box filled with dense dotting. The second rank (606) for the second cache policy is the value of the projection of the second policy metric (602) onto the objective function (610). As seen in FIG. 6.2, the second rank (606) is smaller than the first rank (604).

Because the second rank (606) is smaller than the first rank (604), the information handling system implements the first cache policy. Specifically, the information handling system programs controllers in its storage system to automatically populate the cache in accordance with rules specified by the first cache policy.

End of Example

Thus, as illustrated in FIGS. 6.1-6.4, embodiments of the invention may provide an information handling system that updates the operation of its storage system and the use of its storage system changes over time due to changes in workloads.

Figure 7:
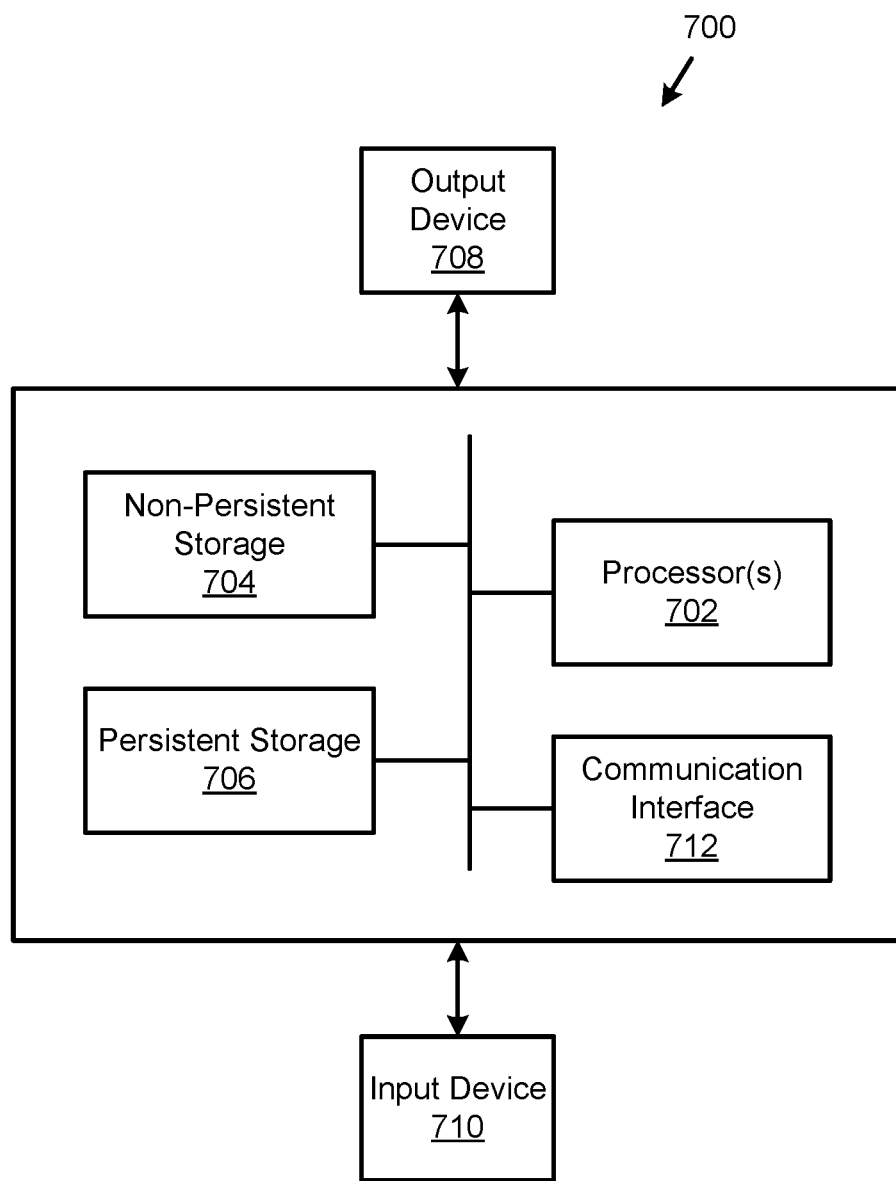
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for providing computer implemented services. Specifically, embodiments of the invention may provide information handling systems that adapt their operation in response to changes in their use. To do so, the information handling system may evaluate the likely performance of any number of manners of operating its various hardware devices using predictive models. The predicted performance of the various methods of operating the hardware devices may be compared in a manner that balances various aspects of performance of these hardware components. By doing so, the information handling system may be more likely to provide higher quality computing resources for performance of its workloads.

Thus, embodiments of the invention may address the problem of limited resources for servicing workloads. For example, by changing the manner in which various hardware devices are operated over time, the aforementioned devices may be better able to provide computing resources for performance of the workloads.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for managing a storage system, comprising:
   storage for storing profile-based cache policy performance prediction models; and
   a storage manager programmed to:
      obtain an input-output profile for a workload hosted by the information handling system during a first period of time;
      obtain performance metrics for cache policies for the storage system using:
         the input-output profile, and
         the profile-based cache policy performance prediction models;
      obtain a ranking of the cache policies based on the performance metrics;
      select a cache policy of the cache policies based on the rankings; and
      update operation of a cache of the storage system based on the selected cache policy for a second period of time.

2. The information handling system of claim 1, wherein the performance metrics comprise:
   for one of the cache policies:
      a predicted hit ratio for the cache during the second period of time; and
      a predicted pollution ratio for the cache during the second period of time.

3. The information handling system of claim 2, wherein obtaining the ranking of the cache policies comprises:
   projecting the predicted hit ratio and predicted pollution ratio on to an objective function to rank one of the cache policies with respect to, at least, another one of the cache policies.

4. The information handling system of claim 3, wherein the objective function provides, for an input hit ratio and an input pollution ratio, a scalar value.

5. The information handling system of claim 4, wherein the objective function weights the input hit ratio and the input pollution ratio equally in calculating the scalar value.

6. The information handling system of claim 1, wherein the second period of time is a future period of time after the first period of time.

7. The information handling system of claim 1, wherein the cache policies specify quantities of data to be pre-fetched into the cache in response to read requests received by the storage system.

8. A method for managing a storage system, comprising:
   obtaining an input-output profile for a workload hosted by an information handling system hosting the storage system during a first period of time;
   obtaining performance metrics for cache policies for the storage system using:
      the input-output profile, and
      profile-based cache policy performance prediction models;
   obtaining a ranking of the cache policies based on the performance metrics;
   selecting a cache policy of the cache policies based on the rankings; and
   updating operation of a cache of the storage system based on the selected cache policy for a second period of time.

9. The method of claim 8, wherein the performance metrics comprise:
   for one of the cache policies:
      a predicted hit ratio for the cache during the second period of time; and
      a predicted pollution ratio for the cache during the second period of time.

10. The method of claim 9, wherein obtaining the ranking of the cache policies comprises:
    projecting the predicted hit ratio and predicted pollution ratio on to an objective function to rank one of the cache policies with respect to, at least, another one of the cache policies.

11. The method of claim 10, wherein the objective function provides, for an input hit ratio and an input pollution ratio, a scalar value.

12. The method of claim 11, wherein the objective function weights the input hit ratio and the input pollution ratio equally in calculating the scalar value.

13. The method of claim 8, wherein the second period of time is a future period of time after the first period of time.

14. The method of claim 8, wherein the cache policies specify quantities of data to be pre-fetched into the cache in response to read requests received by the storage system.

15. A non-transitory computer readable medium comprising computer readable program code, which when executed by a computer processor enables the computer processor to perform a method for managing a storage system, the method comprising:
    obtaining an input-output profile for a workload hosted by an information handling system hosting the storage system during a first period of time;
    obtaining performance metrics for cache policies for the storage system using:
       the input-output profile, and
       profile-based cache policy performance prediction models;
    obtaining a ranking of the cache policies based on the performance metrics;
    selecting a cache policy of the cache policies based on the rankings; and
    updating operation of a cache of the storage system based on the selected cache policy for a second period of time.

16. The non-transitory computer readable medium of claim 15, wherein the performance metrics comprise:
    for one of the cache policies:

a predicted hit ratio for the cache during the second period of time; and a predicted pollution ratio for the cache during the second period of time.

17. The non-transitory computer readable medium of claim 16, wherein obtaining the ranking of the cache policies comprises:

projecting the predicted hit ratio and predicted pollution ratio on to an objective function to rank one of the cache policies with respect to, at least, another one of the cache policies.

18. The non-transitory computer readable medium of claim 17, wherein the objective function provides, for an input hit ratio and an input pollution ratio, a scalar value.

19. The method of claim 18, wherein the objective function weights the input hit ratio and the input pollution ratio equally in calculating the scalar value.

20. The method of claim 15, wherein the second time period is a future period of time after the first period of time.

* * * * *